(12) United States Patent
Rockwell

(10) Patent No.: US 7,715,819 B2
(45) Date of Patent: May 11, 2010

(54) AIRBORNE SECURITY MANAGER

(75) Inventor: Laurence I. Rockwell, Redmond, WA (US)

(73) Assignee: The Boeing Company, Chicago, IL (US)

( * ) Notice: Subject to any disclaimer, the term of this patent is extended or adjusted under 35 U.S.C. 154(b) by 1007 days.

(21) Appl. No.: 09/992,310

(22) Filed: Nov. 19, 2001

(65) Prior Publication Data
US 2003/0027550 A1 Feb. 6, 2003

Related U.S. Application Data

(60) Provisional application No. 60/309,862, filed on Aug. 3, 2001.

(51) Int. Cl.
*H04M 11/04* (2006.01)
(52) U.S. Cl. .................. 455/404.1; 455/4.1; 455/404.2; 455/414.1; 455/67.3; 709/223; 709/224; 709/206; 340/568.1; 340/572.1
(58) Field of Classification Search ................ 455/67.3, 455/431, 404.1, 404.2, 414.1; 709/223, 224, 709/206, 225; 340/568.1, 572.1; 713/201, 713/200, 225, 224
See application file for complete search history.

(56) References Cited

U.S. PATENT DOCUMENTS

| | | | |
|---|---|---|---|
| 4,825,457 A | 4/1989 | Lebowitz | |
| 4,868,859 A | 9/1989 | Sheffer | |
| 5,027,383 A | 6/1991 | Sheffer | |
| 5,055,851 A | 10/1991 | Sheffer | |
| 5,537,460 A | 7/1996 | Holliday, Jr. et al. | |
| 5,866,888 A | 2/1999 | Bravman et al. | |

(Continued)

FOREIGN PATENT DOCUMENTS

EP 0 890 907 A1 1/1999

(Continued)

OTHER PUBLICATIONS

ICSA, Inc., An Introduction to Intrusion Detection Assesment for System and Network Security Management, 1998, pp. 1-38.*

(Continued)

*Primary Examiner*—Charles N Appiah
*Assistant Examiner*—Randy Peaches
(74) *Attorney, Agent, or Firm*—Harness, Dickey & Pierce, P.L.C.

(57) ABSTRACT

An airborne security management system is provided for monitoring security activities in a mobile network platform. This system includes a mobile network that is interconnected via an unreliable communication link to a terrestrial-based network security management system; an intrusion detection system connected to the mobile network and operable to detect a security intrusion event whose origination is associated with the mobile network; and a mobile security manager adapted to receive the security intrusion events from the intrusion detection system. The mobile security manager is operable to transmit a message indicative of the security intrusion event to the network security management system and to perform security response activities in response to security commands received from the network security management system. The mobile security manager is further operable to command security response activities on the mobile network platform, when the mobile network platform is not connected with network security management system.

7 Claims, 9 Drawing Sheets

U.S. PATENT DOCUMENTS

| | | |
|---|---|---|
| 5,917,405 A | 6/1999 | Joao |
| 6,052,604 A | 4/2000 | Bishop, Jr. |
| 6,092,008 A | 7/2000 | Bateman |
| 6,177,887 B1 | 1/2001 | Jerome |
| 6,392,692 B1 * | 5/2002 | Monroe ................. 348/143 |
| 6,408,391 B1 * | 6/2002 | Huff et al. ............... 713/201 |
| 6,725,378 B1 * | 4/2004 | Schuba et al. ........... 713/201 |
| 6,757,712 B1 * | 6/2004 | Bastian et al. ........... 709/206 |
| 2002/0082886 A1 * | 6/2002 | Manganaris et al. ........ 705/7 |

FOREIGN PATENT DOCUMENTS

WO     WO 99/57625     11/1999

OTHER PUBLICATIONS

"An Introduction to Intrusion Detection Assessment" prepared by The Security Assurance Company.

* cited by examiner

AIRBORNE SECURITY MANAGER

This application claims priority under 35 U.S.C. §119(e) to U.S. Provisional Application No. 60/309,862 filed on Aug. 3, 2001, and entitled "An Airborne Security Manager" the specification and drawings of which are hereby expressly incorporated by reference.

TECHNICAL FIELD

The present invention relates generally to an airborne security management system for monitoring security activities in a mobile network platform, and more particularly to an autonomous airborne security manager for responding to detected security intrusion events when the mobile network platform is or is not in communication with a terrestrial-based network security management system.

BACKGROUND OF THE INVENTION

Broadband data and video services, on which our society and economy have grown to depend, have heretofore generally not been readily available to users onboard mobile network platforms such as aircraft, ships, trains, automobiles, etc. While the technology exists to deliver such services to most forms of mobile network platforms, past solutions have been generally quite expensive, with low data rates and/or available to only very limited markets of government/military users and some high-end maritime markets (i.e., cruise ships).

Previously developed systems which have attempted to provide data and video services to mobile network platforms have done so with only limited success. One major obstacle has been the high cost of access to such broadband data and video services. Another problem is the limited capacity of previously developed systems, which is insufficient for mobile network platforms carrying dozens, or even hundreds, of passengers who each may be simultaneously requesting different channels of programming or different data services. Furthermore, presently existing systems are generally not readily scalable to address the demands of the traveling public.

Of particular interest, presently existing systems also have not comprehensively addressed security issues relating to the mobile network platform. Therefore, it is desirable to provide a network security architecture for monitoring, reporting and responding to onboard security activities in a mobile network platform. It is envisioned that such a network security architecture should be designed to (a) secure computing resources to which passengers may have access on the mobile platform; (b) communicate reliably with terrestrial-based system components over an unreliable communication link; (c) provide a policy mediated response to detected security intrusion events occurring on the mobile platform; and (d) scale the management of the system to hundreds or thousands of mobile platforms.

SUMMARY OF THE INVENTION

In accordance with the present invention, an airborne security management system is provided for monitoring security activities in a mobile network platform. The security management system includes a mobile network that is interconnected via an unreliable communication link to a terrestrial-based network security management system; an intrusion detection system connected to the mobile network and operable to detect a security intrusion event whose origination is associated with the mobile network; and a mobile security manager adapted to receive the security intrusion events from the intrusion detection system. The mobile security manager is operable to transmit a message indicative of the security intrusion event to the network security management system and to perform security response activities in response to security commands received from the network security management system. The mobile security manager is further operable to command security response activities on the mobile network platform, when the mobile network platform is not connected with network security management system.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
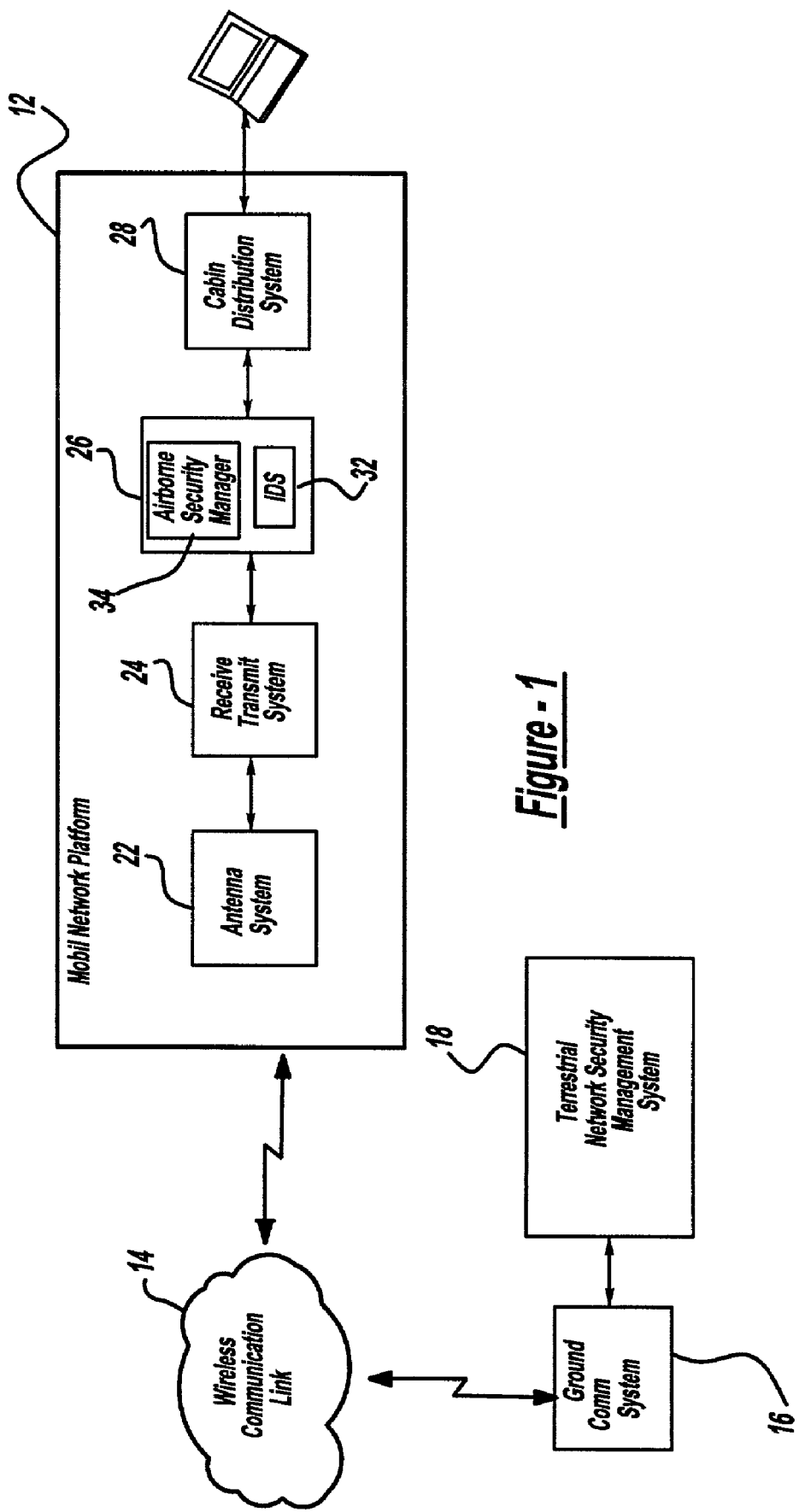
FIG. 1 is a block diagram depicting a network security architecture for a mobile network platform in accordance with the present invention.

FIG. 1 illustrates a network security architecture 10 for monitoring security activities in an unattended mobile network platform 12. The primary purpose of the network security architecture 10 is to monitor, record, report and respond to security-relevant events associated with the mobile network platform 12. In a preferred embodiment, the network security architecture 10 supports a mobile network platform residing in an aircraft. The mobile network platform 12 is in turn interconnected via one or more unreliable wireless communication links 14 to a terrestrial-based communication system 16, including a terrestrial-based network security management system 18. While the following description is provide with reference to an airborne application, it is readily understood that the broad aspects of the network security architecture are applicable to mobile network platforms which may reside in passenger buses, cruise ships, etc.

It is envisioned that the mobile network platform 12 provides aircraft passengers a suite of broadband two-way data and video communication services. The infrastructure allows information to be transferred to and from the aircraft at high enough data rates to support a variety of services. To do so, the mobile network platform 12 is primarily comprised of four subsystems: an antenna subsystem 22, a receive and transmit subsystem (RTS) 24, a control subsystem 26, and a cabin distribution subsystem 28. Each of these four subsystems will be further described below.

The antenna subsystem 22 provides two-way broadband data connectivity and direct broadcast television reception capability to the aircraft. Although the invention is not limited thereto, the antenna subsystem 22 is generally designed to provide this connectivity during cruise conditions (limited roll and pitch angles) of the aircraft. Connectivity with the aircraft is most commonly achieved via a K band Fixed Satellite Service (FSS) satellite, a Broadcast Satellite Service (BSS) satellites, and/or a direct broadcast television service (DBS) satellite.

For illustration purposes, additional description is provided for the processing associated with Ku band satellite broadcast signals. The antenna subsystem 22 may receive and/or transmit Ku band satellite broadcast signals. The antenna system 22 down-converts an incoming Ku-band signal, amplifies, and outputs the L-band signals to the RTS 24. The antenna system may also provide a broadband downlink capability. In this case, the antenna system 22 receives an L-band data signal from an on-aircraft modem, up-converts this signal, amplifies it and then broadcasts as a Ku band signal to selected satellite transponders.

The receive and transmit subsystem (RTS) 24 operates in receive and transmit modes. In receive mode, the RTS 24 may receive rebroadcast video signals, rebroadcast audio signals and/or IP data embedded in an L-band carrier. The RTS 24 in turn demodulates, de-spreads, decodes, and routes the received signals to the cabin distribution subsystem 28. In transmit mode, the RTS 24 sends IP data modulated into an L-band signal. The RTS 24 encodes, spreads, and modulates the signal the IP data it receives from the cabin distribution subsystem 28.

The control subsystem 26 controls the operation of the mobile security platform 12 and each of its four subsystems. Of particular interest, the control subsystem 26 includes one or more intrusion detection subsystems 32 and an airborne security manager 34. An intrusion detection subsystem 32 is operable to detect security intrusion activities which may occur on or in relation to the mobile network platform. To do so, an intrusion detection subsystem 32 inspects all of the data packets entering a computing device on which it is hosted and, upon detection of a security intrusion activity, transmits a security intrusion event to the airborne security manager 34. As will be apparent to one skilled in the art, the intrusion detection subsystem 32 may be implemented using one of many commercially available software products.

The airborne security manager 34 is responsible for enforcing security policy for an aircraft. Because communication with the aircraft may be sporadic, the airborne security manager 34 must provide the capability to act autonomously when responding to security intrusion events. When a security intrusion event is detected, the airborne security manager 34 responds appropriately in accordance with a customizable security policy. Thus, the airborne security manager 34 is adapted to receive security intrusion events from any of the intrusion detection subsystems and operable to implement a security response. Exemplary responses may include warnings one or more passengers on the aircraft, alerting terrestrial-based security administrators, and/or disconnecting a passenger's network access.

The cabin distribution subsystem (CDS) 28 provides network connectivity through a plurality of user access points to the passengers of the aircraft. In a preferred embodiment, the cabin distribution system may be composed of either a series of 802.3 Ethernet switches or 802.11X wireless access points. It should be noted that the current 802.11B standard only allows for a shared secret between all users of a wireless access point and thus is not suitable for providing the desired level of communication privacy in the passenger cabin. In contrast, next generation wireless standards, such as 802.11X ("X" denotes a revision of 802.11 beyond "B") will support "channelized" or individual user level encryption. It is envisioned that such wireless standards are within the scope of the present invention.

Each user access point preferably has the properties of a managed layer 3 switch. First, each user access point must enforce the association of IP address and Media Access Control (MAC) Address with a particular port. This requirement his applicable to either a wired and wireless cabin environment. A second requirement for each user access point is to accept a command to shut off its access port. In the case of a wireless access device, a communication channel consisting of a particular frequency, time division or sub-frame substitutes for the physical access port. A third requirement for each user access point is to preclude passengers from eavesdropping or receiving Ethernet packets not directly addressed to them. In a wired cabin distribution system, this can be accomplished through the use of a switched Ethernet architecture. In a wireless cabin distribution system, this can be accomplished through the use of "channel level encryption" specific to a particular user.

The design of a security policy mechanism is the most fundamental element of the network security architecture 10. In accordance with the present invention, it is envisioned that the security policy will be designed within the following design constraints. First, the security policy mechanism should map different security intrusion events to different responses. It should be appreciated that the severity of response is based on the danger of the detected activities. Second, the automated response policy has to be enforced at all times (subject to over-ride conditions), regardless of whether airborne to terrestrial communications are available or not. If the automated responses are disabled during periods of connectivity, the connectivity might fail before a security administrator has a chance to take action in which case the system reverts to the automated policy in effect prior to the override. The security administrator can retract the response if they desire. Third, the policy mechanism has to arbitrate between automated responses from the airborne security manager and manual commands received from terrestrial-based security administrators. If the automated system mistakenly blocks a passenger's network address, and the terrestrial administrator overrides that action, the security policy mechanism needs to know about that action and not try to enforce the block.

Figure 2A:
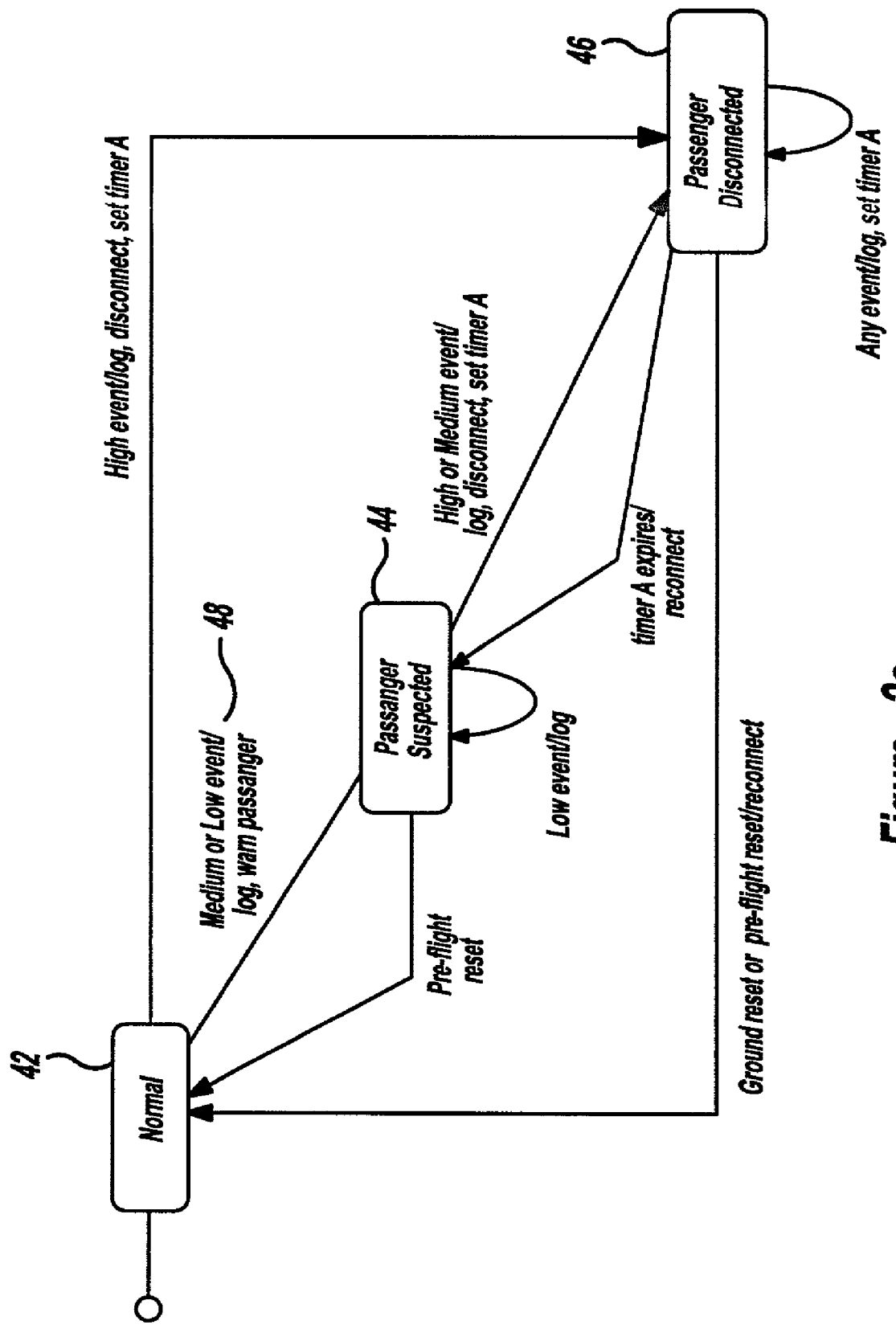
FIGS. 2A and 2B are state machine diagrams illustrating a security policy for a given user access point on the mobile network platform in accordance with the present invention.
Figure 2B:
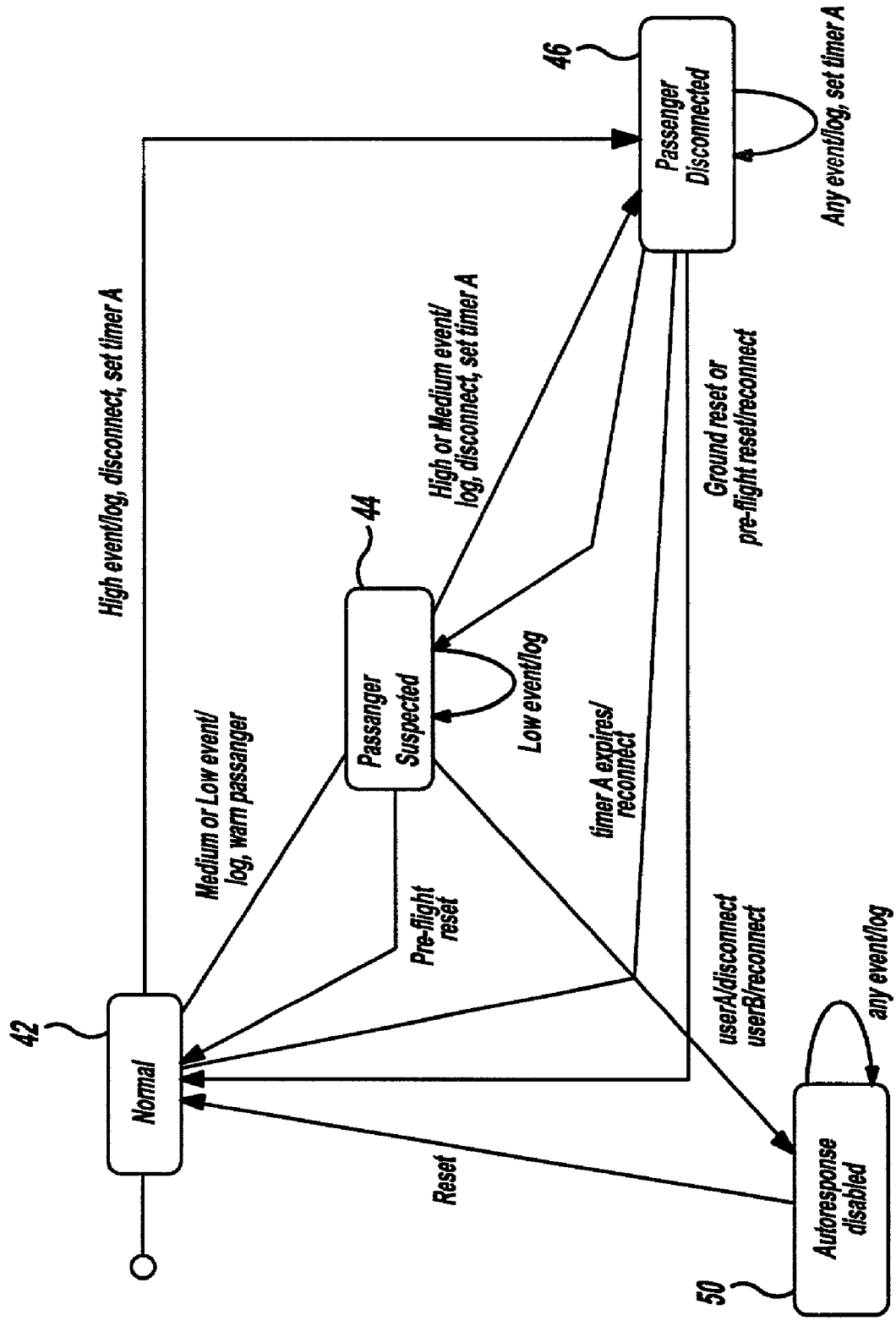

State machines are a flexible, yet intuitively appealing, mechanism for modeling complex behaviors. Therefore, state-machines have been chosen to represent the security policies of the present invention. FIGS. 2A and 2B illustrates basic UML state machines which model the security policy associated with an user access point in the mobile network platform.

In FIG. 2A, each user access point can be in one of three defined states. By default, all user access points begin in a normal state 42. A security intrusion event of any kind will result in a transition to either a suspected state 44 or a disconnected state 46 for the applicable user access point. Each transition is in the form of "event/response" where events are the external triggers that cause the state transition and responses are external actions that the system initiates when making the transition. For instance, a low or medium priority event 48 occurring in a normal state will cause the system to log the event and/or attempt to provide a warning to the passenger connected at that user access point. The user access point then transitions to the suspected state as shown in FIG. 2A.

State machine models may be enhanced to incorporate manual controls. Specific manual control commands enable a terrestrial-based security administrator to explicitly disable or enable a user access point from the ground. By adding a state that indicates that the user access point is under manual control ensures that the automated responses do not override the manual control command received from the security administrator. Therefore, it is envisioned that each state machine may provide an autoresponse disable state 50 as shown in FIG. 2B. Transitions to and from the autoresponse disable state are commanded by a terrestrially-based security administrator. While in the autoresponse disable state, the administrator can initiate any one of various predefined security responses. In the event connectivity is lost between the administrator and the aircraft, the state machine model reverts to the normal state or the previous state depending on configuration settings.

State machines models are also used to represent each of the host servers or other types of computing devices which reside on the mobile security platform. In this way, a server that is under attack may respond differently than a user access point. It is also envisioned that each of the state machines can be tied together through synthetic event generation, such that when a server is under attack, the user access points may employ a different security policy that is less tolerant of suspicious behavior.

Figure 3:
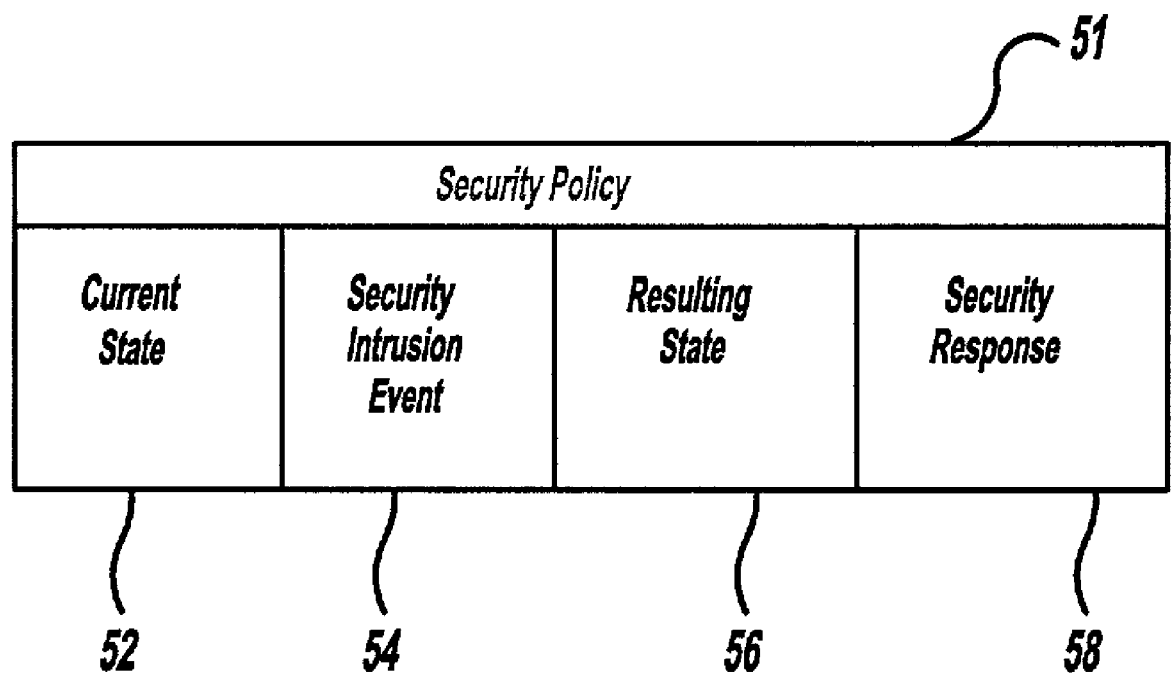
FIG. 3 is a diagram of an exemplary data structure for implementing the security policies of the present invention.

Each state machine can be represented by a data structure 51 as depicted in FIG. 3. The data structure includes a current state 52, a possible security event 54, a resulting state 56 and a possible response 58. In this way, each state can be cross-referenced against possible events to produce a resulting state and a list of possible actions. Possible events may include (but are not limited to) a security intrusion event having high priority, a security intrusion event having medium priority, a security intrusion event having a low priority, a reset event, a timer expiration event, a communication link up event, a communication link down event and one or more custom events for supporting manual control commands from the security administrator. Possible responses may include (but are not limited to) setting a timer, installing a filter, resetting a filter, alerting control panel, alerting terrestrial-based security administrator, disconnecting user access point, issuing a passenger warning, and one or more predefined customer responses. One skilled in the art will readily recognize from such discussion how to implement a security policy mechanism in accordance with the present invention.

Figure 4:
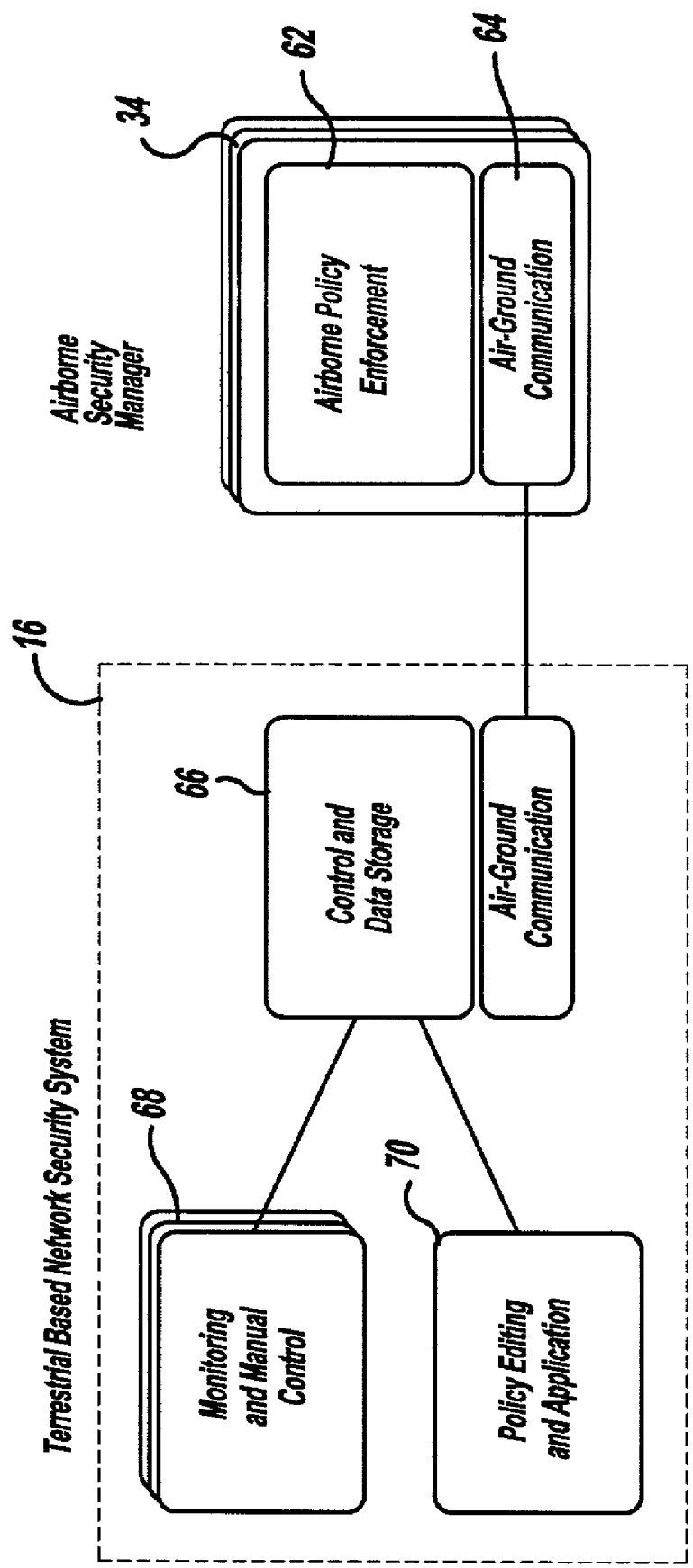
FIG. 4 is a diagram depicting the primary software components of the network security architecture of the present invention.

Referring to FIG. 4, the overall network security architecture 10 may be logically decomposed into five major components. The five major components are airborne policy enforcement 62, air-ground communication 64, terrestrial control and data storage 66, terrestrial monitoring and manual control 68, and terrestrial policy editing and assignment 70. Each of these logical components are also mapped to their physical location within the network security architecture 10 as shown in FIG. 4.

The airborne policy enforcement component 62 is provided by the airborne security manager 34. The primary responsibilities of the airborne security manager include (but are not limited to) managing and monitoring intrusion detection sensors, monitoring other airborne event sources, responding to security events in accordance with the applicable security policy, monitoring the airborne intrusion detection sensors, configuring static network traffic filters at user access points, executing any manual overrides commands from the terrestrial-based network security management system, installing new security policies received from the terrestrial-based network security management system, and reporting events and status of interest to the terrestrial-based network security management system. As will be apparent to one skilled in the art, the airborne security manager 34 is comprised of one or more software applications residing on one or more server(s) on each aircraft. A configuration of redundant airborne security managers provide for fail over in the event of a hardware or software failure.

Figure 5:
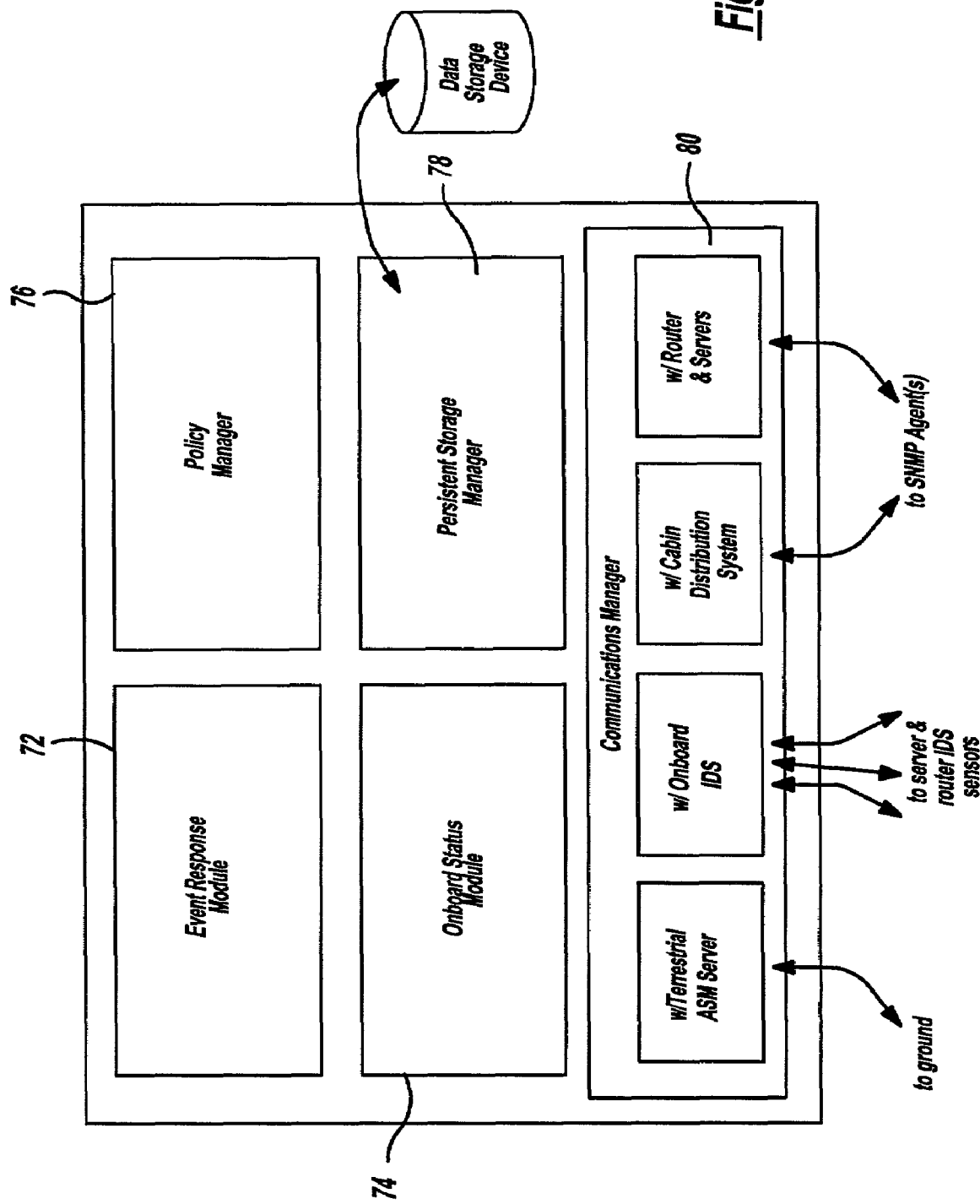
FIG. 5 is a block diagram depicting the functional software modules which comprise the airborne security manager in accordance with the present invention.

With reference to FIG. 5, the airborne security manager 34 is further comprised of five functional modules: an event response module 72, an onboard status module 74, a policy manager 76, a persistent storage manager 78, and a communication manager 80. The event response module 72 is responsible for receiving events, interpreting the active security policy, and triggering the appropriate actions in response to each event. It should be appreciated that this module is adapted to handle events other than security intrusion events received from the intrusion detection subsystems.

In conjunction with the onboard status module 74, the event response module interprets and executes the state machine representing the active security policy. For instance, upon arrival of a security intrusion event, the event response module determines whether the event is associated with an individual passenger connection, an individual host server, or the airborne security manager as a whole. This module then retrieves the current state of that passenger connection, host server, or airborne security manager from the onboard status module 74 and performs the actions associated with that state and event in accordance with the active security policy. Exemplary actions may include issuing new events, making state transitions, modifying network filters, disabling passenger connections, and/or queuing messages for transmission to the terrestrial-based network security management system.

The onboard status module 74 maintains the current state of each individual passenger connection, each host server, and of the airborne security manager as a whole for the purpose of directing the state machine event response. The onboard status module 74 also tracks the status of intrusion detection sensors (e.g., signature file, operational/inactive status, sensor configuration) as well as collects status information from the other onboard modules.

The policy manager 76 is responsible for reacting to commands from the terrestrial-based network security system regarding security policy loading and activation. The policy manager also serves as a repository for configuration information relating to the airborne security manager, including, for instance, general communications parameters that determine frequency of status reports and event reporting.

The persistent storage manager 78 manages the overall data storage requirements for the onboard network security architecture. Data residing in persistent storage generally falls into one of three categories: (1) communications queue (i.e., messages to be transmitted to the terrestrial-based security management system), (2) onboard status (i.e., per-passenger connection, per-host, and system-wide data requirements), and (3) security policies. The persistent storage manager may rely on various well known, lightweight mechanisms for data storage.

Referring to FIG. 4, the terrestrial control and data storage (C&DS) component 66 is provided by the terrestrial-based network security management system 16. The control and data storage functions include (but are not limited to) storing all event data in persistent storage, tracking the desired and last known configurations for each aircraft, supporting multiple security management consoles having multiple windows, notifying open console windows of any data changes that affect the window contents, providing an interface for effecting manual overrides in security policy, offering a reporting interface for reviewing stored data, and controlling access to all stored data. This component may be implemented using Java-based applications residing on one or more terrestrial servers which constitute the network security management system 16.

Figure 6:
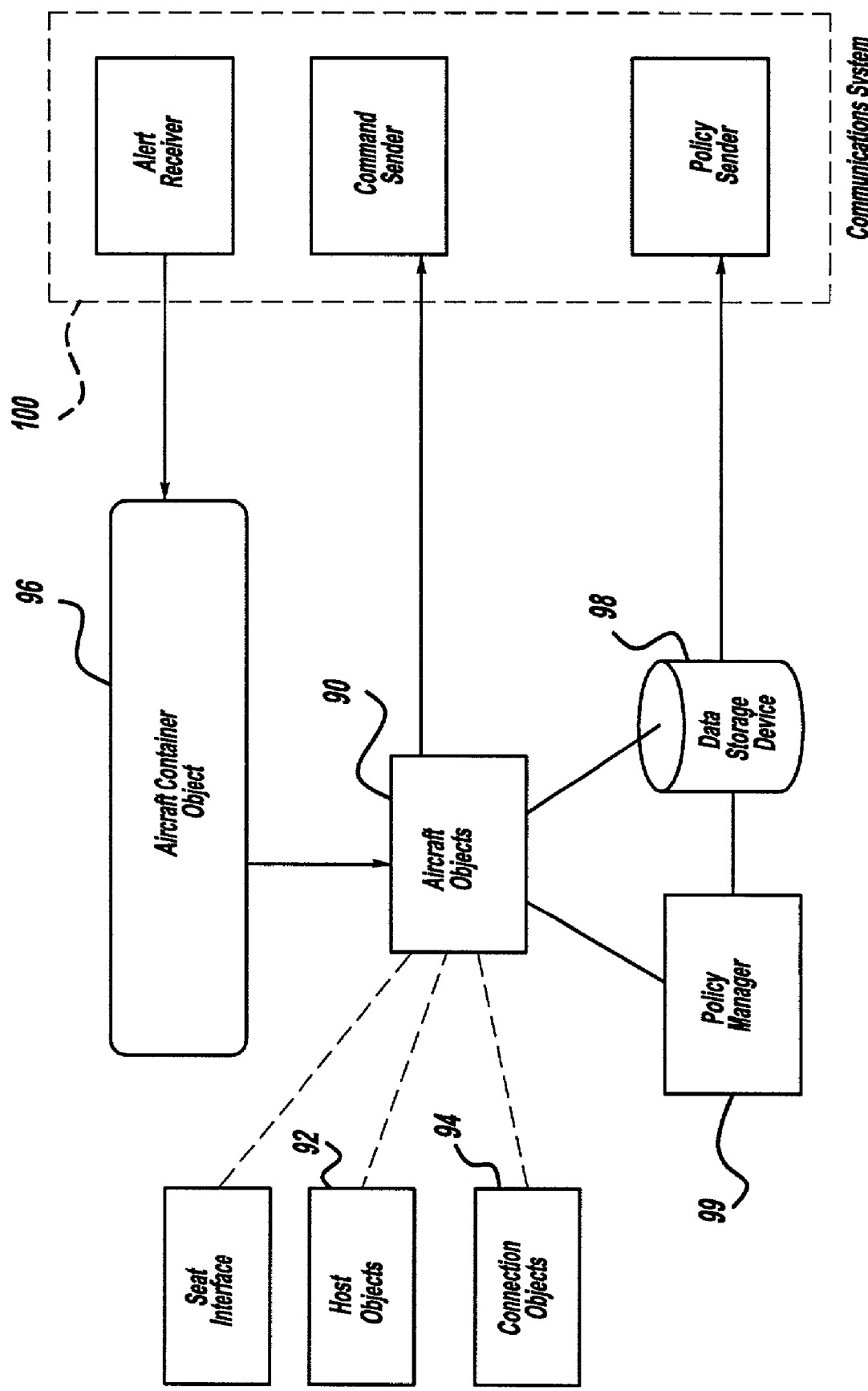
FIG. 6 is a block diagram depicting the functional components implementing the terrestrial control and data storage functions of a terrestrial-based network security system in accordance with the present invention.

A more detailed description of the terrestrial control and data storage component 66 is provided with reference to FIG. 6. This terrestrial component will maintain one aircraft object 90 for each aircraft associated with the security architecture. The aircraft object 90 maintains all state information for a given aircraft as well as keeps track of the last reported and the desired state of the airborne security manager 34 residing on the given aircraft. The aircraft object 90 is a dynamic object, such that it state is maintained in dynamic memory and can be reconstructed from event histories, if necessary. Any activity that could alter the state of the airborne security manager 34 is performed by invoking a method of the aircraft object. Each method represents an event and is logged in an appropriate event log. In addition, these methods are all synchronized, ensuring that only one thread can be effecting state changes at any given time. In order to eliminate the possibility of deadlock, none of these event operations will block on communication or issue events to other aircraft.

The aircraft object 90 uses a communication subsystem 100 to exchange information with the airborne security manager 34. The aircraft object 90 issues commands and requests for status reports as well as receives events and status reports. Until an appropriate event or status report is received, any command is considered pending. This does not mean that the command has not yet executed—it may not have been executed, or it may have been and the acknowledging status report has simply not yet been received. Due to this gap in knowledge about what is actually taking place onboard the aircraft, the aircraft object 90 must carefully differentiate between the last known status and the desired status.

The aircraft object 90 is the controller in a Model-View-Controller architecture as is well known in the art. In this paradigm, the model is the data stored in a database, and the views are the various user interfaces being used to display information about the aircraft. The aircraft object is responsible for updating all of the views any time the model changes. In order to enforce this, all changes to the model must be performed by the aircraft object and the aircraft object must keep track of those user interfaces that could be affected by the change.

The aircraft object 90 also maintains a collection of host objects 92 and passenger connection objects 94. The host objects 92 are used to represent the state of each onboard host server that the airborne security manager 34 is responsible for. The passenger connection objects 94 represent the individual passenger connections to the onboard network.

The terrestrial control and data storage component 66 also includes a single aircraft container object 96. It is envisioned that this object may be implemented as a collection class, such as a hash table. Under this approach, aircraft objects will be created by the aircraft container 96 for every aircraft in the system. By routing incoming communication through the aircraft container 96, we ensure that the communication subsystem 100 will be able to deliver incoming messages to the appropriate aircraft object. In addition, the container concept may be used to facilitate the manner in which aircraft objects are created. For instance, aircraft objects may be created only as they are needed. When an incoming message is received, the aircraft container 96 locates the applicable aircraft object. If the aircraft object is not present in memory, the aircraft container can create the object. Likewise, aircraft objects that are no longer being actively monitored could be deleted until they are needed again.

The terrestrial control and data storage component 66 will also maintain event histories for each of the aircraft in a central database 98. The database 98 will maintain a record of all the events reported by an aircraft in the system. In addition, it will maintain a record of all of the commands performed by terrestrial-based security administrator. The former represents the last known state of each aircraft; whereas the latter represents the desired stated of each aircraft. The choice of the term "last known" reflects the time delay between events occurring on board the aircraft which might not have been reflected on the ground.

Security policy files are also stored within the database 98. As a configuration option, in order to maintain a history of old policies, the policy tables may be append-only. The primary policy table will maintain a mapping of names and version numbers to a series of smaller policy elements. The communication subsystem 100 interfaces with the database 98 in order to retrieve security policy files and update the policy files onboard the aircraft.

A policy manager 99 will be responsible for any changes to policy files. This object is necessary because policy is the only thing that is not associated with a single aircraft. The policy manager 99 will ensure that any changes to policy files are properly versioned. It will also be responsible for delivering updated policy to one or more aircraft.

Returning to FIG. 4, the terrestrial monitoring and manual control component 68 and the terrestrial policy editing and assignment component 70 also reside at the terrestrial-based network security management system 12. The monitoring and manual control component functions include (but are not limited to) monitoring the state and activities of a group of aircraft and selecting an individual aircraft for closing examination, monitoring the state and activities of a single aircraft and selecting an individual server or passenger connection for closer examination, monitoring the state and activities of a single airborne server, manually controlling a single airborne server, monitoring the state and activities of a single airborne passenger connection, and manually controlling a single airborne passenger connection. This component may be implemented using a Java-based user interface running on one or more terrestrial servers.

Figure 7:
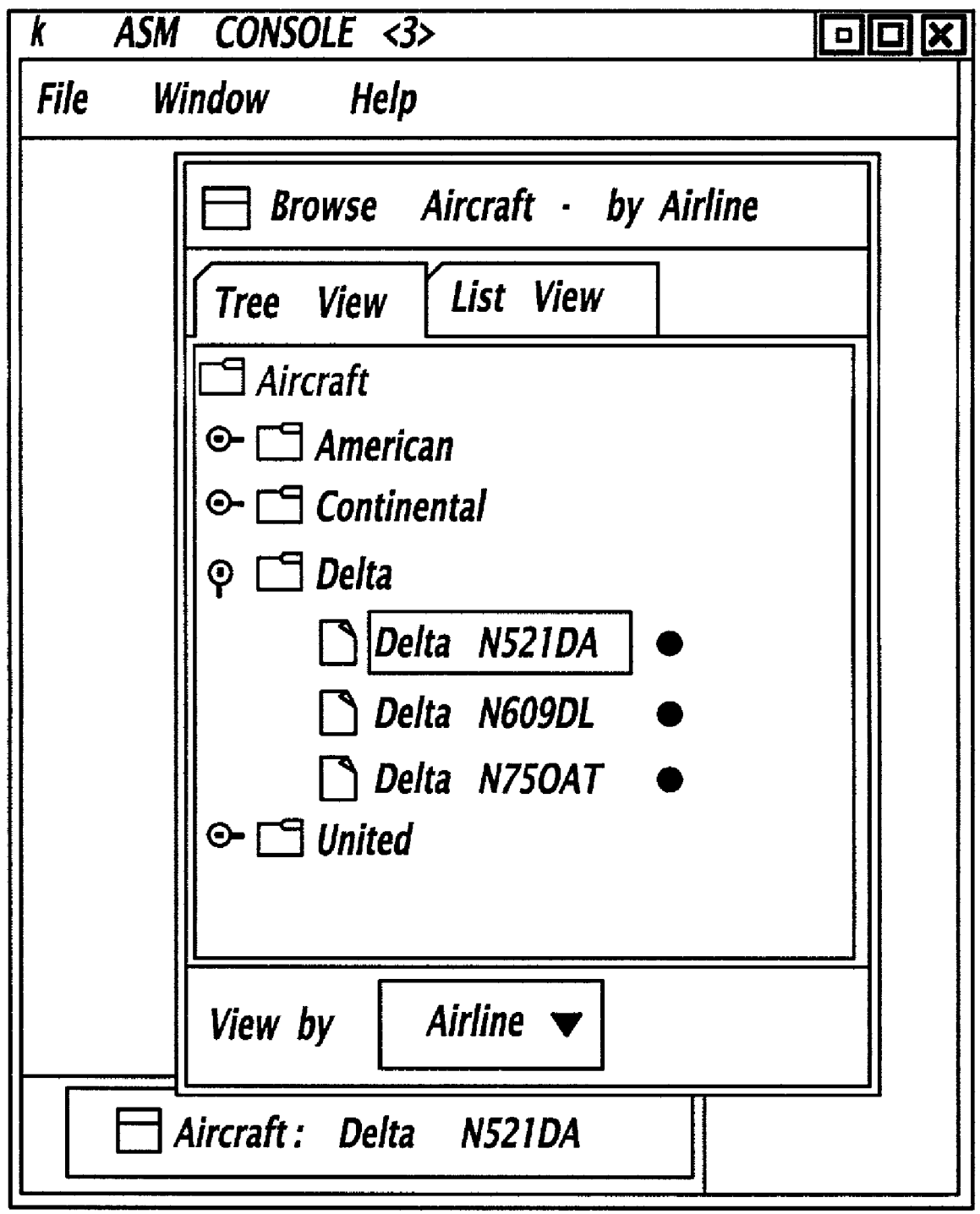
FIG. 7 is an exemplary aircraft browser window used to implement the monitoring and manual control functions of a terrestrial-based network security system in accordance with the present invention.
Figure 8:
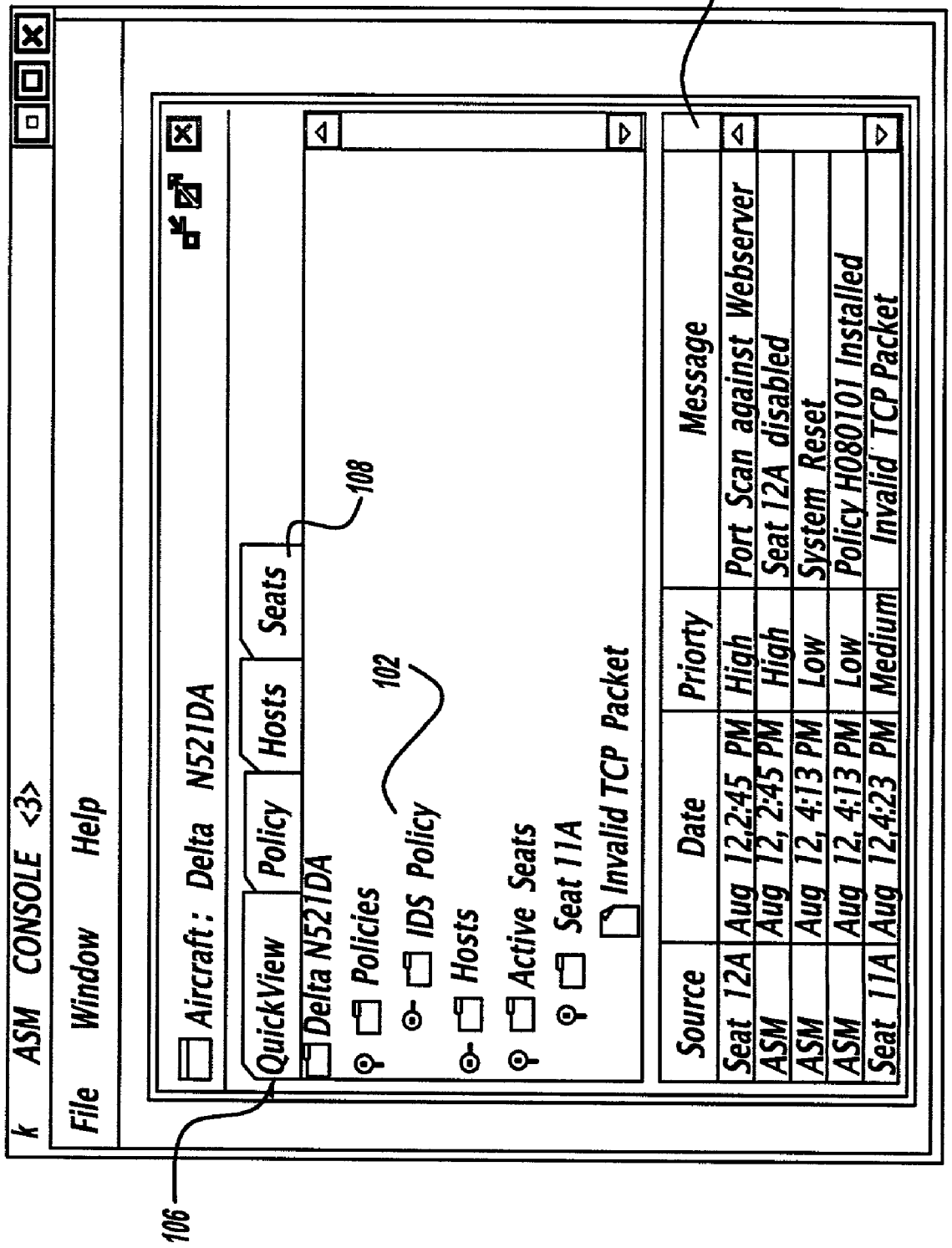
FIG. 8 is an exemplary aircraft status window used to implement the monitoring and manual control functions of a terrestrial-based network security system in accordance with the present invention.

To support the monitoring and manual control functions, the user interface includes a number of windows that may be monitored by a human network security administrator. For instance, an aircraft browser allows groups of aircraft to be navigated and aggregate/summary information displayed as shown in FIG. 7. However, this window does not show the status of the communication link. In order to display such status information, the user can select a specific aircraft from the aircraft browser, thereby navigating to an aircraft status window. An exemplary aircraft status window is shown in FIG. 8. The aircraft status window enables the user to view all data relevant to a specific aircraft in a single tree structure view 102. In addition, all logged events and commands are displayed in a lower log panel 104. The tabs 106 along the top of the window permit navigation to other panels which in turn focus on a different specific element associated with the aircraft. For instance, the seat panel 108 will provide status information, log detail, and manual controls for a specific seat. Other exemplary windows used to support the monitoring and manual control functions may include (but is not limited to) a passenger connection status window that focuses on displaying information for a single passenger connection, an onboard host status window that focuses on displaying information on a specific host computing device residing on the aircraft, and an events log window that displays event information for a given group, aircraft, passenger connection or host device. It is envisioned that the above-described windows are merely representative of some of the functionality and appearance that be used to implement the monitoring and manual control functions of the present invention.

In addition to monitoring and manual control, services for editing security policy files and distributing security policy updates also reside at the terrestrial-based network security management system 16. The policy editing and application functions include (but are not limited to) editing sensor configuration files, retrieving intrusion detection signature file updates from the applicable vendor website, editing response policy state machines and parameters, editing static security configurations, combining sensor files, signature files, response policies, and static configuration into specific security policies, providing version control over security policy updates, browsing the aircraft in the system by last known policy and desired policy, and distributing a new policy to a selected group of aircraft. The editing of security policy is not intended to be a routine daily activity. For this reason, policy editing and application functions are treated as a separate, distinct logical component from the other functions administered through the user interface running on the terrestrial servers.

The air-ground communication component 64 is responsible for communication between the airborne security manager and the terrestrial servers. Thus, this component is distributed across these two physical locations. The air-ground communication functions include (but are not limited to) providing non-blocking communications, retrying transmissions until reliable delivery is achieved, queuing up messages during periods of non-connectivity, handling communication session authentication, utilizing cryptographic integrity checks to protect against tampering and replay, optimizing away redundant or superseded messages where possible, utilizing available bandwidth according to message priorities, minimizing bandwidth consumption, and delivering security policy updates to aircrafts. Logically isolating the communications component helps protect the design of the airborne security manager and the terrestrial servers from unnecessary complexity arising from sporadic connectivity.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. In a mobile platform, a security system for monitoring an onboard communication system communicating with a terrestrial-based system over an intermittent link, the security system comprising:
    an onboard communication network accessible for use by a plurality of users onboard the mobile platform;
    an intrusion detection system onboard the mobile platform for monitoring use of the onboard network for detecting if a potential intrusion event has occurred by one of the plurality of users onboard the mobile platform; and
    an onboard security management system responsive to the intrusion detection system for initiating an action to address the potential intrusion event, based on a set of security policies, the action able to be directed to at least a selected one of a plurality of user access points on the onboard network, the set of security policies defining the action as initiatable subject to an override of the action through the terrestrial-based system and as changeable, when the intermittent link makes communication with the terrestrial-based system unavailable, to restore a previous policy-defined state of the selected user access point;
    and the onboard security management system receives updates to said security policies from the terrestrial-based system when said intermittent link is operational;
    wherein the action includes one of:
        notifying a particular user on the onboard network that a suspected intrusion event has occurred; or
        blocking access by the particular user to the onboard network;
    the security system further provides a status indication as to a status of the onboard network.

2. The security system as recited in claim 1, wherein the onboard security management system further operates to provide an alert message to the terrestrial-based system when an intrusion event is detected.

3. The security system recited in claim 1, wherein said status indication provides a status of a current operational state of each one of a plurality of network user access points of the onboard network.

4. The security system recited in claim 3, wherein the indication indicates one of:
    a normal operational state;
    a suspect operational state wherein an intrusion event is suspected; and
    a disconnect state in which access by a user of a specific access point on the onboard network is prevented.

5. The security system recited in claim 1, wherein the onboard security management system notifies the terrestrial-based system that a potential intrusion event has occurred.

6. The security system recited in claim 1, where the action taken by the onboard security management system further includes installing a network traffic blocking filter on said user access point on which a potential intrusion event has occurred.

7. A method for monitoring an onboard network on a mobile platform, the method comprising:
    providing a plurality of network access points to users on the mobile platform, the access points capable of providing access by user devices to an onboard network configured to communicate with a terrestrial-based system over an intermittent link;
    monitoring the onboard network to detect an intrusion event made by at least one of the users on the mobile platform;
    using a security management system onboard the mobile platform, and responsive to notification of an intrusion event, initiating a security action to address the intrusion event, in accordance with a set of security policies, where the security action can be directed to one or more selected access points on the network; and
    indicating an operational status of the network, the operational status resulting from the initiated action when the intermittent link prevents communication with the terrestrial-based system, the set of security policies defining the status as changeable based on whether the intermittent link makes input from the terrestrial-based system available for transitioning the one or more selected user access points into an auto-response disabled state.

* * * * *